United States Patent
Jones et al.

(10) Patent No.: US 11,526,466 B2
(45) Date of Patent: Dec. 13, 2022

(54) UNIFORM GROWTH FOR DIFFERENTLY SIZED FILES

(71) Applicant: salesforce.com, inc., San Francisco, CA (US)

(72) Inventors: Matthew William Jones, Carmel, IN (US); Jeffrey Keith Landis, Indianapolis, IN (US); Gabriel Daniel Kiddy, Lebanon, IN (US)

(73) Assignee: Salesforce, Inc., San Francisco, CA (US)

( * ) Notice: Subject to any disclaimer, the term of this patent is extended or adjusted under 35 U.S.C. 154(b) by 523 days.

(21) Appl. No.: 16/549,348

(22) Filed: Aug. 23, 2019

(65) Prior Publication Data
US 2021/0056072 A1 Feb. 25, 2021

(51) Int. Cl.
*G06F 16/00* (2019.01)
*G06F 16/13* (2019.01)
*G06F 16/17* (2019.01)

(52) U.S. Cl.
CPC .......... *G06F 16/13* (2019.01); *G06F 16/1734* (2019.01)

(58) Field of Classification Search
CPC ...................................................... G06F 16/13
USPC ........................................................ 707/741
See application file for complete search history.

(56) References Cited

U.S. PATENT DOCUMENTS

| | | | | |
|---|---|---|---|---|
| 10,592,336 B1* | 3/2020 | Donlan | ............... | G06F 11/1076 707/707 |
| 2016/0259785 A1* | 9/2016 | Brown | ............... | G06F 16/2228 707/707 |
| 2019/0034472 A1* | 1/2019 | Evens | .................... | G06F 16/22 707/707 |
| 2020/0403781 A1* | 12/2020 | Gentry | ................... | H04L 9/008 707/707 |

* cited by examiner

*Primary Examiner* — Alexandria Y Bromell
(74) *Attorney, Agent, or Firm* — Holland & Hart LLP

(57) ABSTRACT

Methods, systems, and devices supporting data storage are described. A database server may store information in a group of files. As more information is stored at the database in the files, the sizes of the files may be increased. Techniques are described for uniformly growing files in the group of files to maintain a similar size for the files as the amount of storage increases. These techniques may prevent one file from becoming disproportionately larger than another file of the file group, supporting efficient read and write operations at the database. The file growth may be based on the file sizes as well as an amount of storage to be added for the group of files. For example, an application managing the file growth may sort the files by size, track uniform growth running totals, and determine file growth commands based on the uniform growth running totals.

18 Claims, 12 Drawing Sheets

UNIFORM GROWTH FOR DIFFERENTLY SIZED FILES

FIELD OF TECHNOLOGY

The present disclosure relates generally to database systems and data processing, and more specifically to uniform growth for differently sized files.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A database system may be used to store information, such as CRM information for a set of tenants in a multi-tenant system. In some cases, the information may be stored at a database server, such as a structured query language (SQL) server. As more information is to be stored in the system, the amount of storage at the database server may increase. However, ad hoc techniques for growing storage at the database server may result in processing latency and inefficient data storage. For example, auto-grow features may result in significant latency overhead for data storage when a growth procedure is triggered. Furthermore, an uneven distribution of data stored at the database server may lead to inefficient search and retrieval procedures for the data, resulting in significant latency for handling queries at the database server.

DETAILED DESCRIPTION

Figure 1:
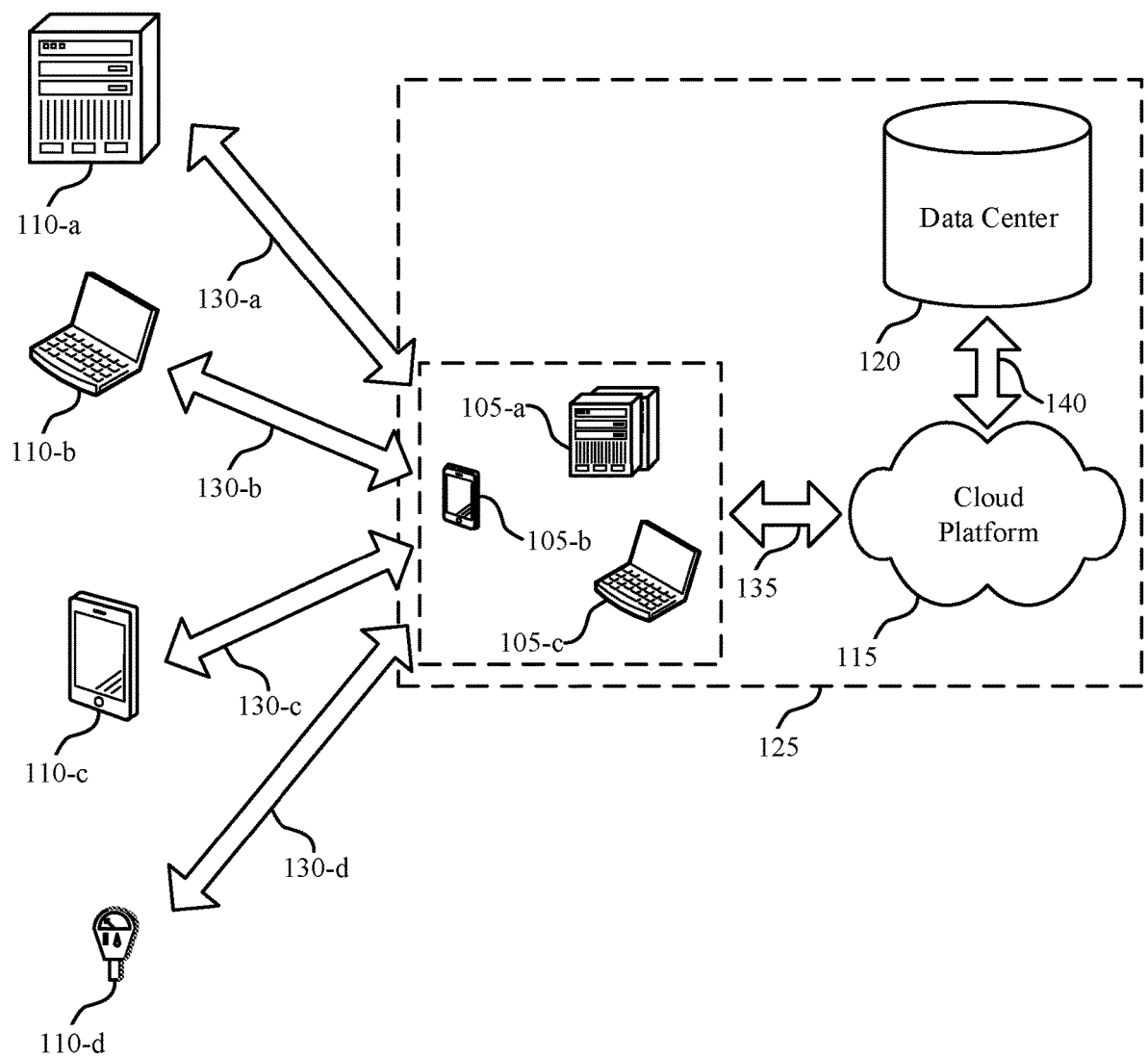
FIG. 1 illustrates an example of a system for file growth handling that supports uniform growth for differently sized files in accordance with aspects of the present disclosure.

In some database systems, a database server (e.g., a structured query language (SQL) server) may store a set of files in a file group. The files may store information for tenants of the database server, such as data records, client information, transaction receipts, etc. The files in the database server may have different sizes. The database server may receive information to store in one or more files until the database server approaches a storage capacity (e.g., one or more of the files are full). When the database server (or a file of the database server) is running low on space, the database server or a system managing the database server may trigger a growth procedure to increase the amount of storage at the database server. In some systems, the growth procedure may determine the amount of storage to add to the database server and may select one of the files to grow by that amount of storage. In some examples, this may lead to files in the database server which have vastly different sizes, where one file of a file group is much larger than the others, or where there is a significant size difference between the largest file of a file group and the smallest file of the file group. Non-uniform file sizes may lead to performance issues for the database server. Additionally or alternatively, the database server may attempt to write information to the files of the file group, where the amount of data written to each file is proportional to the amount of free space at that file. However, this may result in the database server writing very little data to particular files while still spending a significant amount of time to write to each file, leading to inefficiencies in the data storage system.

Techniques are described herein to support uniform file growth at a database server. An application, executing at an application server, may determine a uniform file size to which the database server is to grow the files of a file group at the database server. For example, the database server may identify a requested size to grow a group of files (e.g., based on a growth trigger) and respective current file sizes for the files of the group. The database server may send the growth size and a list of file sizes for the file group to the application server. The application server may sort the list of file sizes from smallest to largest. Then, starting from the smallest file size to the largest file size, the application server may calculate a running total of storage, where a uniform growth running total for each file corresponds to an amount of storage that can be used to make each preceding file in the list the same size as the current file. The application server may identify which file (e.g., a threshold file) has the greatest uniform growth running total that is less than the amount of space to be added to the file group. The application may then set a target file size to grow each file up to and including the threshold file to a same file size. The application may send a growth command to the database server to grow files according to the determined target file size.

By utilizing these techniques, smaller files of the database server may be grown first, which may eventually result in files which are uniform in size across the file group. Accordingly, inefficiencies at the database server caused by having files with vastly different sizes may be mitigated. For example, eventually growing the files in the file group to a uniform size with similar free space may result in the database server, when performing a write operation, writing a similar amount of data to each of the files in the file group. This may efficiently share the file resources of the database server when storing data. Additionally, the growth statements executed at the database server may not result in errors, as the described techniques may not attempt to modify files to unsupported sizes (e.g., sizes smaller than the current file size, sizes beyond the requested growth size, etc.).

Aspects of the disclosure are initially described in the context of an environment supporting an on-demand database service. Aspects of the disclosure are further illustrated by and described with reference to apparatus diagrams, system diagrams, and flowcharts that relate to uniform growth for differently sized files.

FIG. 1 illustrates an example of a system 100 for file growth handling that supports uniform growth for differently sized files in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A cloud client 105 may be an example of, or utilize, a database server as described herein. The cloud client 105 may manage information (e.g., client information, records, receipts, transactions, etc.) for one or more contacts 110. This information may be stored in a file group consisting of a set of files. In some cases, the database server may be included in the data center 120, and the cloud client 105 may store information in and retrieve information from the database server via the cloud platform 115. The files in the database server may have different sizes. The database server may receive data and may store the data until the database server approaches a storage capacity, one or more of the files are full, or a combination thereof. When the database server is running low on space, a growth procedure may be triggered to increase the amount of storage in the database server. The growth procedure may be triggered by the database server, by an application running in the cloud platform 115, or by the cloud client 105.

In some conventional systems, a growth procedure may include identifying the amount of storage to add for the group of files (i.e., the file group) and selecting just one of the files to grow by that amount of storage. Alternatively, the growth procedure may be triggered for a single file of the file group. In some cases, this may lead to files in the database server which have vastly different sizes. For example, one file of the file group may become much larger than the others, or a significant size difference may develop between the largest file of the file group and the smallest file of the file group as storage is added for the file group. Having files with greatly different sizes in a file group may lead to some performance issues for the database server. In some cases, the database server may attempt to distribute writing information across the files, where the data is written to each file proportional to the amount of free space that the file has remaining. In an example, a first file may have a relatively large amount of free space left, and a second file may have a very small amount of remaining space (e.g., as compared to the first file). The database server may write to both files, where significantly less data is written to the second file when compared to the first file based on the proportional amount of free space remaining. In this example, writing such a small amount of data to a file may be inefficient for the database server.

Techniques are described herein to support uniform file growth at a database server. An application may determine a uniform file size to which the database server is to grow one or more files of a file group at the database server. In some cases, an application server may execute the application via the cloud platform 115. The database server may identify a requested size to grow a group of files. The requested growth size may be determined based on an amount of information to be added to the database server. In some cases, the requested growth size may include an additional overhead which may be larger than an anticipated amount of data to be added. The database server may also identify a list of current file sizes for the files of the file group.

The database server may send the growth size and a list of file sizes for the group to the application server. The application server may sort the list of file sizes from smallest to largest. Once sorted, the application server may iterate through the files starting from the first, smallest file and going to the last, largest file. For each iteration, the application server may keep track of the size of a preceding file, as well as a running total of space up until a file of the current iteration (e.g., a current file). If there is a difference between the size of the preceding file and the current file, the application server may take the difference and multiply it by the number of previously seen files. For example, for file n, the application server multiplies $(size(n)-size(n-1))*(n-1)$, then add this value to the running total for file n−1. The running total for file n may correspond to the amount of storage that would be added to make all files in the list of files up to file n the same size.

The application server may identify the first file in the list that has a running total size that exceeds the amount of space to be added to the file group. If a running total size for list index n is smaller than the amount of space to be added to the file group, then each file up to file n in the list can be made the same size by distributing the storage size increase across those files. The file which has a greatest running total that does not exceed the requested growth may be referred to as a threshold file having a threshold list index. The application server may set a target file size to grow each file up to and including the threshold file to be the same size. Alternatively, the first file sequentially in the list which has a running total that exceeds the requested growth may be referred to as the threshold file having the threshold list index, and the application server may set a target file size to grow each file up to (e.g., smaller in size than) the threshold file to be the same size.

The application server may transmit an indication to the database server to grow a subset of the files (e.g., each file in the list up to the threshold file) to a target file size. The database server may increase the size of the subset of files to the target file size. By utilizing these techniques, smaller files may be grown first, which may eventually result in files which are uniform (or nearly uniform) in size across the file group. Eventually, these files may also have similar amounts of free space. Therefore, inefficiencies at a database server caused by having files with vastly different sizes may be mitigated.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a cloud client 105 may store a large amount of data in a group of files at a database server. As contacts 110 utilize services provided by the cloud client 105, the amount of data stored in the database server may increase. The database server may request for an application server to perform a growth procedure to accommodate the additional data to be stored. In some cases, the growth procedure may be triggered based on monitoring a rate of incoming data being stored at the database server. The growth procedure may, for example, be triggered prior to running out of space at any one file of the group of files.

The database server, storing information for the cloud client 105, may transmit a list of file sizes for the group of files to the application server. The application executing at the application server may determine sizes to grow a subset of files of the group of files and send an indication of the sizes to the database server. The database server may then modify the sizes of the subset of files based on the indication. In some cases, the database server may be a SQL server or database, and the indication may be a set of SQL commands. The SQL server may perform the SQL commands to modify file sizes when requesting more space for the group of files.

Figure 2:
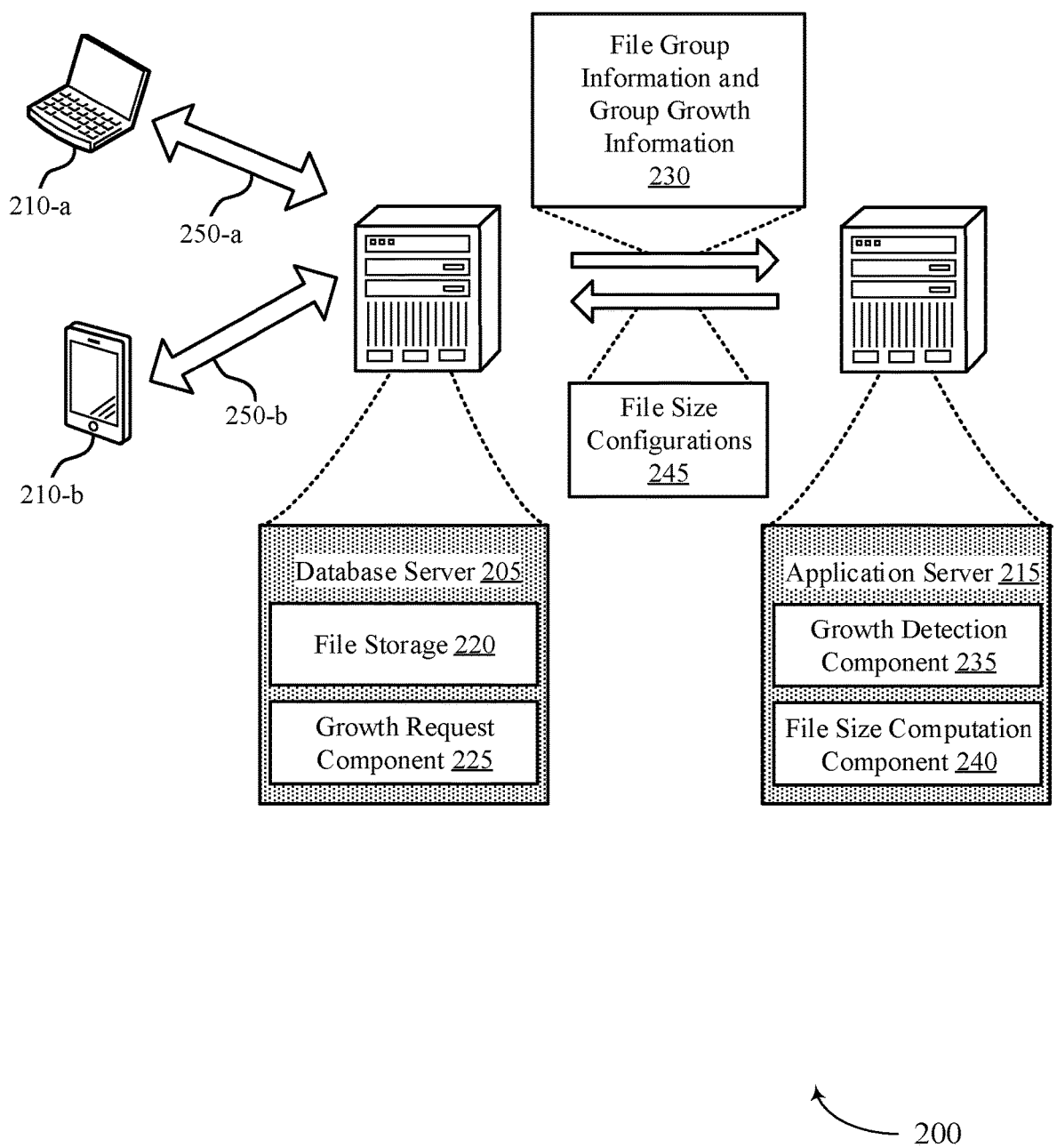
FIG. 2 illustrates an example of a subsystem that supports uniform growth for differently sized files in accordance with aspects of the present disclosure.

FIG. 2 illustrates an example of a subsystem 200 that supports uniform growth for differently sized files in accordance with aspects of the present disclosure. The subsystem 200 may include a database server 205, devices 210, and an application server 215. The devices 210 (e.g., device 210-a and device 210-b) may, in some cases, be examples of client devices, user devices, or devices corresponding to tenants of the database server 205. The database server 205 may, in some cases, provide aspects of a multi-tenant database. In some examples, the database server 205 may be an example of a server cluster, a virtual machine, a container, or the like. For example, the database server 205 may be an example of a SQL server database.

The database server 205 may store information for one or more clients, customers, or tenants. For example, the database server 205 may store one or more files including records, receipts, transactions, customer or client information, etc. The files may be stored in a file storage 220 at the database server 205. In some cases, the database server 205 may be an example of a SQL server database and the files for the SQL server database may be examples of data files (e.g., storing data and objects such as tables, indexes, etc.), log files (e.g., storing recovery information), or a combination thereof. Each data file may utilize one or more pages for data storage, where a page stores data in rows of a table or in some other configuration (e.g., for relatively large data objects). The data files may be grouped into one or more file groups, and each data file may be the primary data file for the SQL server database or a secondary data file. Different files may be put on different disks or disk drives for the database server 205. Accordingly, a single file group may be spread across multiple disks or disk drives, supporting improved read and/or write performance (e.g., as compared to single-disk storage) and scalability as new files are added, new disks are added, or both. Implementing multiple file groups at the database server 205 may support storing data objects on specific physical disks, separating resource-intensive data objects (e.g., data objects with a large memory footprint), efficiently managing database queries (e.g., by harnessing parallel input/output (I/O) across files and/or file groups), or some combination thereof.

The database server 205 may receive information to store until an allotment of information stored by the file group, or at least by one of the files, approaches capacity. For example, the devices 210 may continue to generate receipts, records, etc., which may be transmitted over communication links 250-*a* and 250-*b* and stored in files at the database server 205.

When the database server 205 is running low on space, it may trigger a growth procedure to increase the amount of storage in the database server 205. For example, each file at the database server 205 may have a specific file size (e.g., an originally specified file size, a file size based on one or more previously triggered growth procedures, etc.). In some cases, the file size may be based on an amount of space available on the disk storing the file, a number of data objects received to store at the file, or a combination thereof. If the database server 205 detects that a file is full or approaching a full capacity, the database server 205 may request for more storage in order to store additional information. The growth procedure may be detected by a growth request component 225 at the database server 205. In some cases, the growth procedure may be based on a file becoming full and being unable to write a requested data object to the file based on any remaining memory capacity at the file. In some other cases, the growth procedure may be triggered based on a rate of information being sent to one or more files of the group, or a rate of information being sent to the group of files as a whole. This rate of information may be based on historical data or a current intake measurement for the database server 205.

In some systems, a growth procedure may determine the amount of storage to add to the group of files, and a database of this system may select one of the files to grow by this amount of storage. For example, the storage increase may not be distributed across multiple files. Alternatively, the growth procedure may grow different files based on different file growth criteria. These growth procedures may lead to files in the group having vastly different sizes. For example, one file of a file group may be much larger than the others, or there may be a significant size difference between the largest file of the group and the smallest file of the group.

Non-uniform file sizes may lead to some performance issues for the database server 205. In some cases, the database server 205 may attempt to write information to the files of a file group proportional to the amount of free space that the files have. In an example, a first file may have 32 gigabytes (GB) of free space left, and a second file may have just 1 GB of free space left. The database server 205 may write very little data to the second file compared to the first file, but the database server 205 may still spend a significant amount of time to write to both files.

An application server 215 may implement techniques to support uniform file growth at the database server 205. An application, executing at the application server 215, may determine a uniform file size to which the database server 205 is to grow one or more of the files. The application may, for example, be a C# application or program—or any other type of application or program—executing on an operating system at the application server 215. In some implementations, the application may run on the database server 205 itself, and the functions described herein with reference to the application server 215 may be performed by the database server 205 storing the files to grow.

The database server 205 may identify a requested size to grow a group of files and respective file sizes for the group of files. The database server 205 may send file group information 230 to the application server 215. The file group information 230 may include the file group growth indicator (e.g., how much storage to add for the group of files) and a set of file sizes for the group of files.

In some cases, a growth detection component 235 at the application server 215 may trigger the uniform growth procedure. In some cases, the application server 215 may monitor the file sizes of the group of files and trigger the uniform growth procedure based on the file sizes. In some examples, if the sizes of the files become uneven or disproportionate (e.g., a difference between a smallest file size and a largest file size exceeds a threshold), the application server 215 may perform the uniform growth procedure. In some examples, the application server 215 may detect a growth trigger for a file of the set of files of the file group, where the file group growth indicator (e.g., the requested growth size) and the set of file sizes are based on detecting the growth trigger. In some cases, the application server 215 may transmit a request for the file group growth indicator and the set of file sizes based on detecting the trigger (e.g., and an automatic growth procedure).

The application server 215 may sort the set of file sizes into a list from smallest to largest. Each file of the list may have a corresponding list index based on size, where the lowest index corresponds to the smallest file and the largest index corresponds to the largest file. Starting from the smallest file size and iterating until the largest file size, the application server 215 may calculate a running total of storage that would be used to make each file up to that point be the same file size. For example, the application server 215 may determine how much space would be added to make the two smallest files the same size, then make the three smallest files the same size, and so on.

The application server 215 may identify a threshold file for file growth. In a first example, the application server 215 may identify the file with the lowest index (e.g., a threshold file) for which the running total exceeds the amount of space to be added to the file group. The application server 215 may set a target file size to grow each file up to (but not including) the threshold file to be the same size. In a second example, the application server 215 may identify the file with the highest index (e.g., a threshold file) for which the running total does not exceed the amount of space to be added to the file group. The application server 215 may set a target file size to grow each file up to (and including) the threshold file to be the same size. Some aspects of the uniform growth procedure may be performed by a file size computation component 240. Techniques for determining a uniform file growth size are described in more detail with reference to FIG. 4.

The application server 215 may transmit an indication to the database server 205 including file size configurations 245. The file size configurations 245 may instruct, or configure, the database server 205 to set (i.e., grow) file sizes for at least a subset of the group of files based on the uniform growth procedure performed by the file size computation component 240. For example, the file size configuration may indicate to grow the first, or smallest, N files to a target file size. Other files of the file group (e.g., not included in the first N files) may not have their sizes adjusted. By utilizing these techniques, smaller files may be grown first, which may eventually result in files which are uniform (or nearly uniform) in size across the file group at the database server 205. Each file of the group of files may then (e.g., eventually) have similar amounts of free space for handling write operations. Therefore, inefficiencies at a database server 205 caused by having files with vastly different sizes may be mitigated. For example, the database server 205 may optimize (or otherwise improve) parallelized I/O processes for reading data from files of a file group, writing data to files of a file group, or both.

Figure 3:
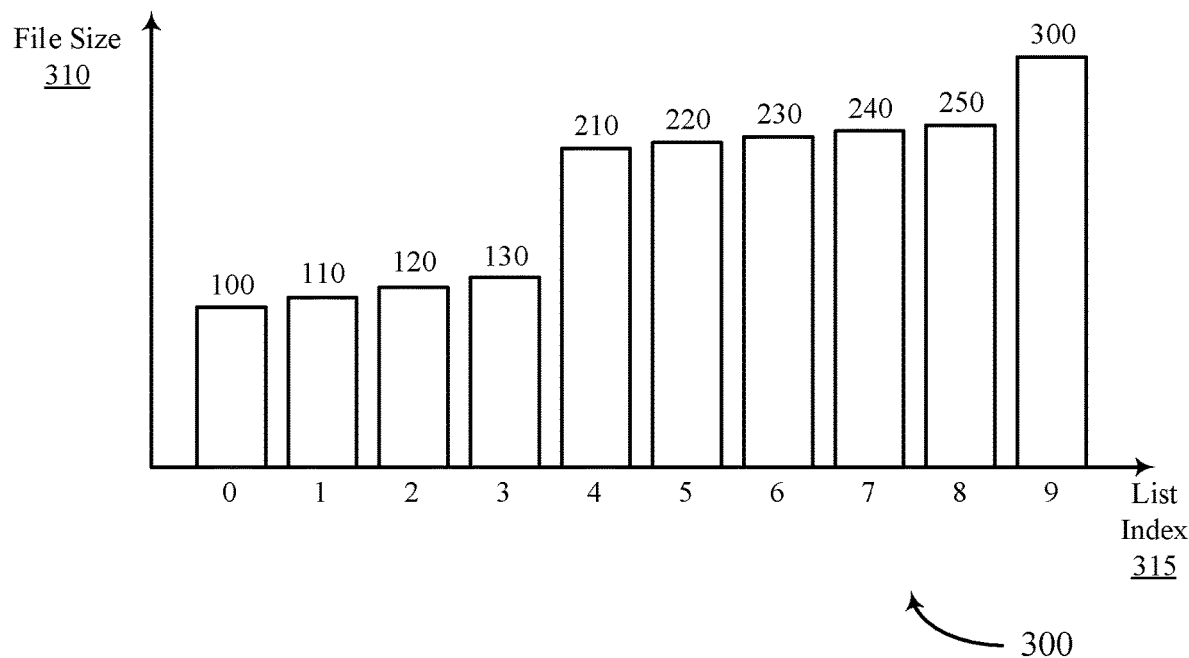
FIG. 3 illustrates examples of file size distributions that support uniform growth for differently sized files in accordance with aspects of the present disclosure.
Figure 3:
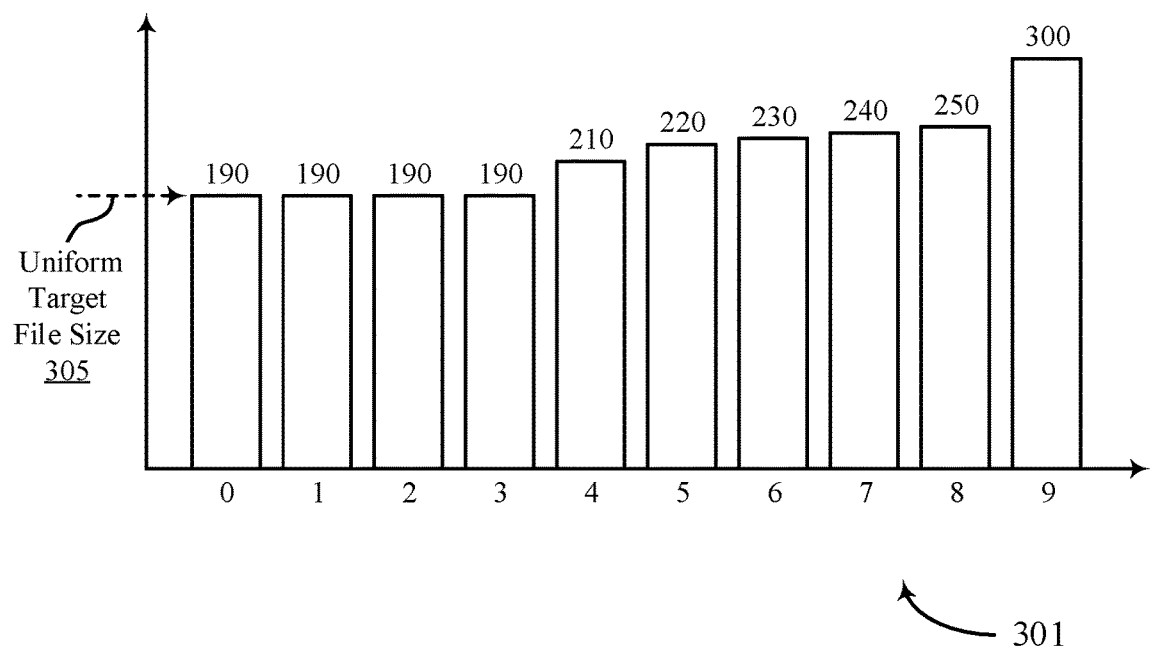

FIG. 3 illustrate examples of file size distributions 300 and 301 that support uniform growth for differently sized files in accordance with aspects of the present disclosure. The file size distributions 300 and 301 may show examples of an organized list of file sizes 310 before and after performing a uniform growth procedure.

The files may be stored at a database server (e.g., a database server 205 as described with reference to FIG. 2), and the uniform growth procedure may be performed at an application server (e.g., an application server 215 as described with reference to FIG. 2) based on receiving some file information from the database server. In some cases, a file may have a current maximum storage capacity. For example, a file may be configured to store 32 GB. As more information is added to that file, the file may reach its storage capacity. Some databases may be able to request for additional storage space to increase the size of a file. For example, once the file is full (e.g., storing 32 GB of information), it may not be able to store more information. So, the database may request to increase the size of the file to, for example, 64 GB. The file may then be allocated additional resources within the database (e.g. a partition of memory allocated to the file, such as available space of a disk drive tied to the file, may be increased).

The file size distribution 300 may be an example of an organized list of file sizes prior to performing a uniform file size growth procedure. As shown, there may be a size difference between the largest file (e.g., at 300 units) and the smallest file (e.g., at 100 units). As described herein, the units used for memory storage may be any unit of data size, such as kilobytes (KB), megabytes (MB), GB, terabytes (TB), or any other relevant unit. If the largest file approaches storage capacity, and a conventional system were to perform a growth procedure that increases the size of a file reaching capacity, the size discrepancy between the largest file and the smallest file may continue to increase, which may cause performance issues for the database server hosting the group of files. Therefore, when a file growth procedure is triggered (e.g., and a uniform file growth procedure is performed as described with reference to FIGS. 2 and 4), instead of increasing the file size for one file, the smaller files of the group may be grown to a uniform size.

The file size distribution 301 may be an example of an organized list of file sizes after performing a uniform file growth procedure. For example, the database server may send, to an application server, the list of file sizes for the ten files shown in the file size distributions 300 and 301 and a requested growth amount, or a file group growth indicator. The file group growth indicator may correspond to an amount of space to be added across the entire group of files. The database server may receive, from the application server, an indication (e.g., or instructions) to grow a subset of files of the group of files up to the uniform target file size 305.

Based on receiving the indication, the database server may grow the subset of the group of files up to the uniform target file size 305. In some cases, the indicator may indicate a threshold list index. The database server may then grow each file which has a file size 310 (or, correspondingly, a list index 315 in the sorted list) smaller than (or smaller than or equal to) the file corresponding to the threshold list index up to the uniform target file size. For example, each file which was smaller than the file with list index '4' (e.g., corresponding to files with sizes 100, 110, 120, and 130) may each be grown to have respective file sizes of 190 units (e.g., the uniform target file size 305).

In some cases, the file group growth indicator may not be able to be evenly distributed across the subset of files. For example, the requested growth size may not be evenly divisible by the number of files to be grown. In this example, some of the files of the subset may be grown to slightly different sizes. For example, if the file group growth indicator has a remainder of two units after distributing across the subset of files evenly, the sizes of two of the files may each be grown by one unit. In this way, even if each of the files of the subset are not grown to be precisely even, the total size growth across the subset of files may still be equal to the requested size increase. In the example of the file size distributions 300 and 301, the total requested size increase may be 300 units which, when spread across four files, may be distributed such that the four smallest files have a size of 190. If, however, the requested size increase were 302 units, then two of the files may be set to have a size of 191 instead of 190.

Figure 4:
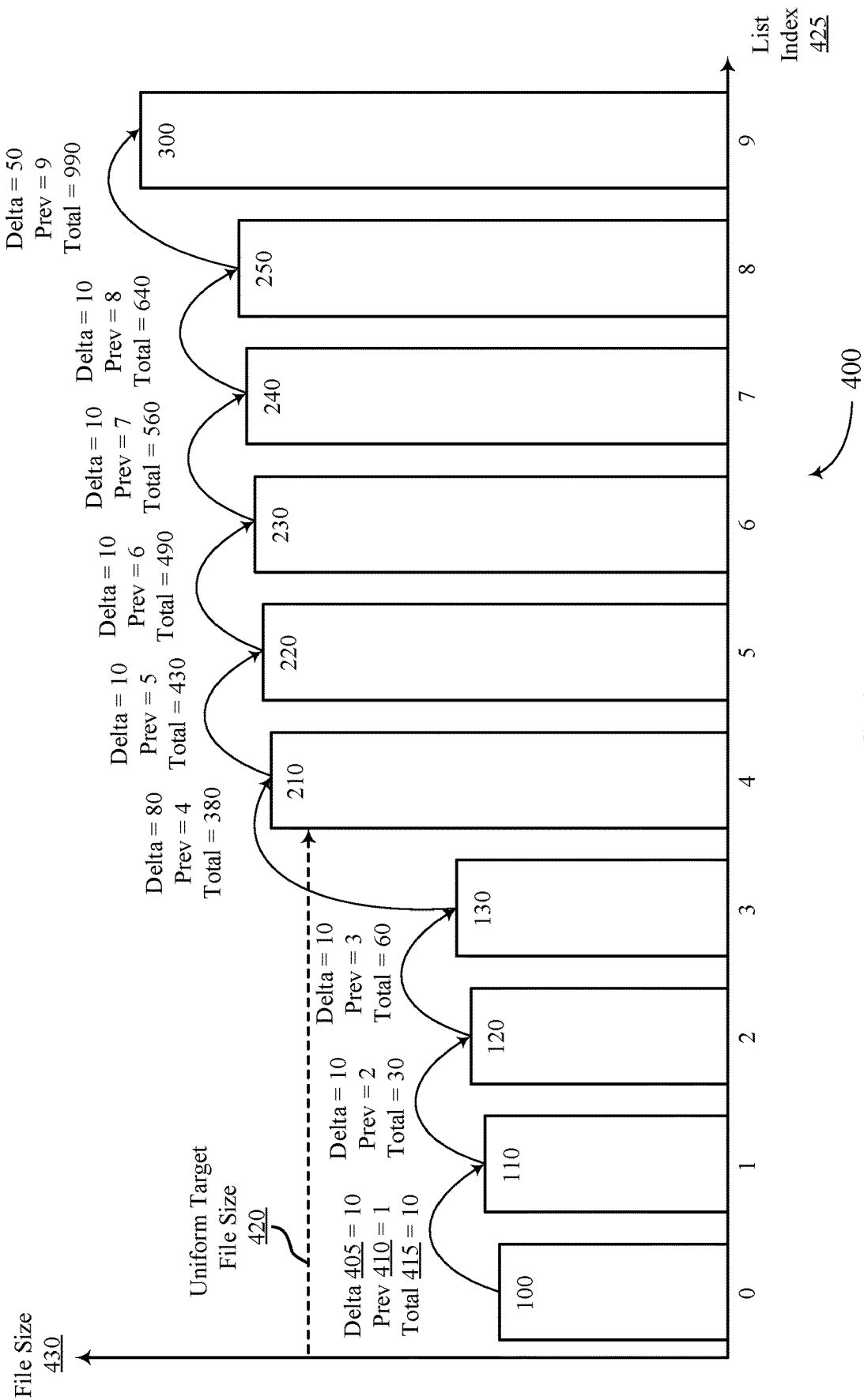
FIG. 4 illustrates an example of a uniform growth procedure that supports uniform growth for differently sized files in accordance with aspects of the present disclosure.

FIG. 4 illustrates an example of a uniform growth procedure 400 that supports uniform growth for differently sized files in accordance with aspects of the present disclosure. The uniform growth procedure 400 may show an example of how an application server may determine a uniform target file size 420 (e.g., a uniform minimum file size for the file group).

The application server may receive file information from a database server. The file information may include a set of file sizes 430 corresponding to a set of files and a file group growth indicator. The file group growth indicator may correspond to an amount of space to be added among the files of the file group.

The application server may sort the set of file sizes 430 into a list. The file sizes may be sorted from smallest (e.g., corresponding to a list index 425 of '0' with a file size 430 of 100) to largest (e.g., corresponding to a list index 425 of '9' with a file size 430 of 300). In this example, the file group growth indicator may request to grow the group of files by 300 units (e.g., based on available disk space, a predicted data intake for the database server, etc.).

Once sorted, the application server may determine a set of running totals for each list index 425. The application server may iterate through the files, starting from the smallest (e.g., list index '0') and going through the largest (e.g., list index '9'). For each file, the application server may keep track of the size of the file that came before it as well as the running total of space up until that point or until that iteration. A running total for a file, or a uniform growth running total, may correspond to the amount of space that would be added to grow each smaller file up to the size of the current file.

A running growth total for a list index may be based on a size difference (e.g., a delta 405) between the list index and the previous list index, a running growth total for the previous list index, and number of previously iterated files. If there is a size difference (e.g., a delta 405) between a file size of a first list index 425 and a file size of a second list index 425, the application server may take the difference and multiply it by the number of files previously seen. This value may be added to the running growth total for the previous list index to obtain the running growth total for the current list index. For example, the application server may determine a running growth total for list index n based on Equation 1.

$$\text{RunningGrowthTotal}(n) = (\text{size}(n) - \text{size}(n-1))*(n-1) + \text{RunningGrowthTotal}(n-1) \quad (1)$$

In an example, for list index '1', a delta 405 between list index '1' and list index '0' may be 10 units. There may be one previous file 410, so a running total 415 for the list index '1' may be 10 units, as it may take 10 units to grow each file smaller than the file with index '1' up to the size of the file with index '1' (i.e., 10 units would be added to grow the file with index '0' to the same size as the file with index '1'). For list index '2', a delta 405 between list index '2' and list index '1' may be 10 units. There may be two previous files 410, so a running total 415 for the list index '2' may be equal to 30 units: 10 units from the running total for list index '1' and 20 units to then grow each smaller file to the size of the file with list index '2'. List index '3' has 130 units of data and list index '2' has 120 units of data, so a delta 405 between list index '3' and list index '2' may be 10 units. When applying Equation 1, the running growth total for list index '3' is equal to (130−120)*(3)+30, so the running growth total for list index '3' may be 60 units.

After iterating through the list of file sizes once, the application server may have a running growth total for each file. For any file in the list, the application server may be able to determine how much space would be used to make all previous files uniform to that file. In some cases, the application server may store this information in memory (e.g., in a table in memory). If storing this information, the application server may not receive file sizes from the database server when determining a uniform growth procedure. Instead, the applications server may track this information internally (e.g., updating the values stored in memory based on any growth commands sent to the database server). Alternatively, the application server may iterate through the list of files when receiving file information and a file group growth indicator and may halt the iteration process once the application server identifies a threshold file for growth.

The application server may identify the largest running total value that is less than or equal to the requested amount of space to be added (e.g., 300 units in this example). The file with index '3' may have a running growth total which is smaller than the requested growth amount, while the file with index '4' may have a running growth total which is greater. Therefore, the application server may grow all files up to and including file '3' to be the same size, or approximately the same size, making the file group more uniform. In this example, the application server may grow a subset of the group of files, the subset including files '0' through '3'. In some cases, the application server may halt calculating the running growth totals upon identifying that the running growth total for the file with index '4' is greater than the file group growth indicator (e.g., to save processing resources and processing latency).

In this example, the uniform target file size 420 is 190 units. Therefore, 90 units may be added to file '0', 80 units may be added to file '1', 70 units may be added to file '2', and 60 units may be added to file '3', which sums up to the requested growth amount of 300. In some cases, if the requested growth amount cannot be evenly distributed among the files up to and including file '3', then some of the files may be set to uneven amounts (e.g., in some cases off by a size of at most 1 unit). After performing the uniform growth procedure, the files may become more uniform in size across the file group. Further, the files may have similar amounts of free space after performing one or more uniform growth procedures.

The application server may generate an indication for the database server based on performing the uniform growth procedure. The indication may indicate how to increase the sizes of the files included in the subset. For example, the indication may configure the database server to grow each file of the subset to the uniform target file size 420. In some cases, the indication may include specific amounts of memory resources for each file of the subset. For example, the indication may configure the database server to increase file '0' by 90 units, file '1' by 80 units, etc. In some cases, the database server may be an example of a SQL server, and the indication may include one or more SQL statements to alter the file sizes. In some cases, the indication may include Transact-SQL (T-SQL) statements to alter (i.e., grow) the file sizes.

Figure 5:
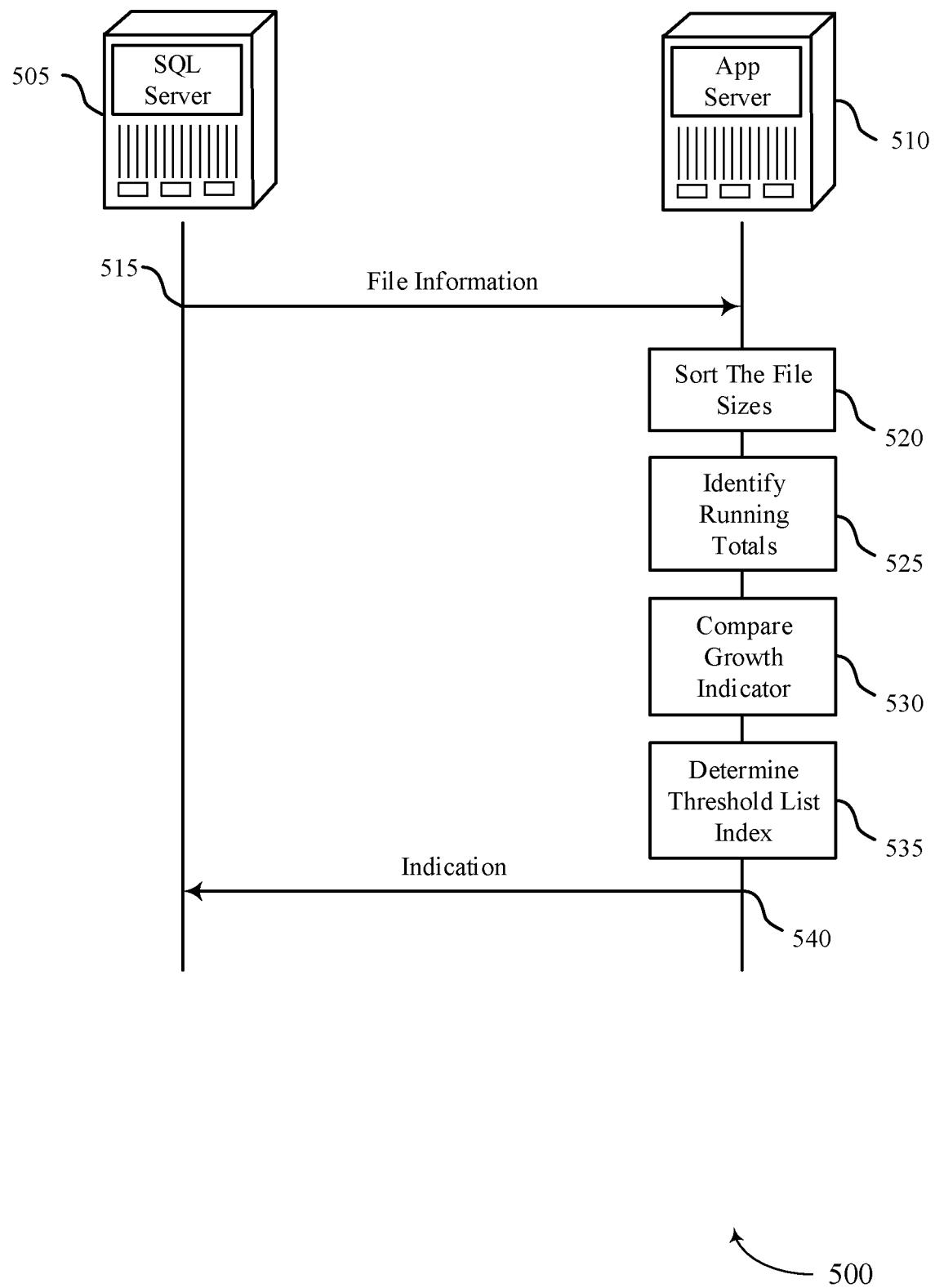
FIG. 5 illustrates an example of a process flow that supports uniform growth for differently sized files in accordance with aspects of the present disclosure.

FIG. 5 illustrates an example of a process flow 500 that supports uniform growth for differently sized files in accordance with aspects of the present disclosure. The process flow 500 includes a server 505 and an application server 510. The server 505 may be an example of a database server 205 as described with reference to FIG. 2. The application server may be an example of an application server 215 described with reference to FIG. 2. In some cases, the processes described herein with reference to the server 505 or the application server 510 may be performed by other devices. For example, the server 505 may perform one or more of the processes described herein with reference to the application server 510.

The server 505 may store information in multiple files. As the server 505 is requested to store more information, the server 505 may increase the sizes of the files in order to store the additional information. Techniques are described herein for uniformly growing the sizes of the files such that the files become uniform, or close to uniform, in size.

At 515, the application server 510 may receive, from the server 505, a file group growth indicator and a set of file sizes corresponding to a set of files of a file group. The file group growth indicator may be an example of the requested growth amount. As the server 505 is requested to store more information, the server 505 may estimate how much space should be added for the file group. The server 505 may indicate this amount to the application server 510 as part of the uniform growth procedure.

At 520, the application server 510 may sort the set of file sizes into a list of files including a set of list indexes such that the smallest file size corresponds to a least list index and the largest file size corresponds to a greatest list index. Generally, the set of file sizes may be sorted by size. A sorted set of file sizes may be described with reference to FIGS. 3 and 4, where a file with a list index '0' has the smallest file size, and a file with the largest list index (e.g., '9' in the examples of FIGS. 3 and 4) has the largest file sizes. Thus, each file and file size may have a corresponding list index once sorted.

At 525, the application server 510 may identify a set of uniform growth running totals for the list of file sizes, where each uniform growth running total for a respective list index of the set of list indexes indicates a total growth amount to grow each file size with a list index less than the respective list index to a file size of the respective list index. In some cases, this may correspond to applying Equation 1 to the list of files. As described with reference to FIG. 4, the application server 510 iterates through the sorted list of files to identify the uniform growth running totals for each index. To uniformly grow each smaller file up to the size of the file with list index '1', it would take 10 units of storage; to grow each file smaller than the file with list index '2' to a size uniform with file '2', it would take 30 units of storage; and to grow each file smaller than the file with list index '4' to a size uniform with file '4', it would take 380 units of storage.

The application server 510 may, at 530, compare the file group growth indicator to each uniform growth running total of the set of uniform growth running totals. With respect to the example described with reference to FIG. 4, the application server 510 may determine that the file group growth indicator is greater than the uniform growth running totals corresponding to list indexes '0', '1', '2', and '3' and smaller than the uniform growth running totals corresponding to list indexes '4', '5', '6', '7', '8', and '9'.

At 535, the application server 510 may determine a threshold list index of the set of list indexes based on the comparing. In an example, the threshold list index may correspond to the list index with a largest uniform growth running total which is smaller than the file group growth indicator. For the example described with reference to FIG. 4, the application server 510 may determine that list index '3' is the threshold list index, as the uniform growth running total for list index '3' does not exceed the file group growth indicator while the uniform growth running total for list index '4' exceeds the file group growth indicator.

In some cases, the application server 510 may determine a minimum file size based on the set of uniform growth running totals and the threshold list index. At 540, the application server 510 may transmit, to the server 505, an indication to grow a subset of files of the set of files corresponding to each list index of the set of list indexes less than or equal to the threshold list index. In an example, the indication to grow the subset of files may indicate to uniformly grow (e.g., grow to a uniform or nearly uniform size) the subset of files based on the minimum file size. For example, the indication may indicate to grow each file of the subset of files to be a uniform target file size, such that each file of the subset of files is set to be the same size, or approximately the same size. For the example described with respect to FIG. 4, the indication may be to grow files corresponding to list indexes '0', '1', '2', and '3' up to the uniform target file size of 190 units.

Figure 6:
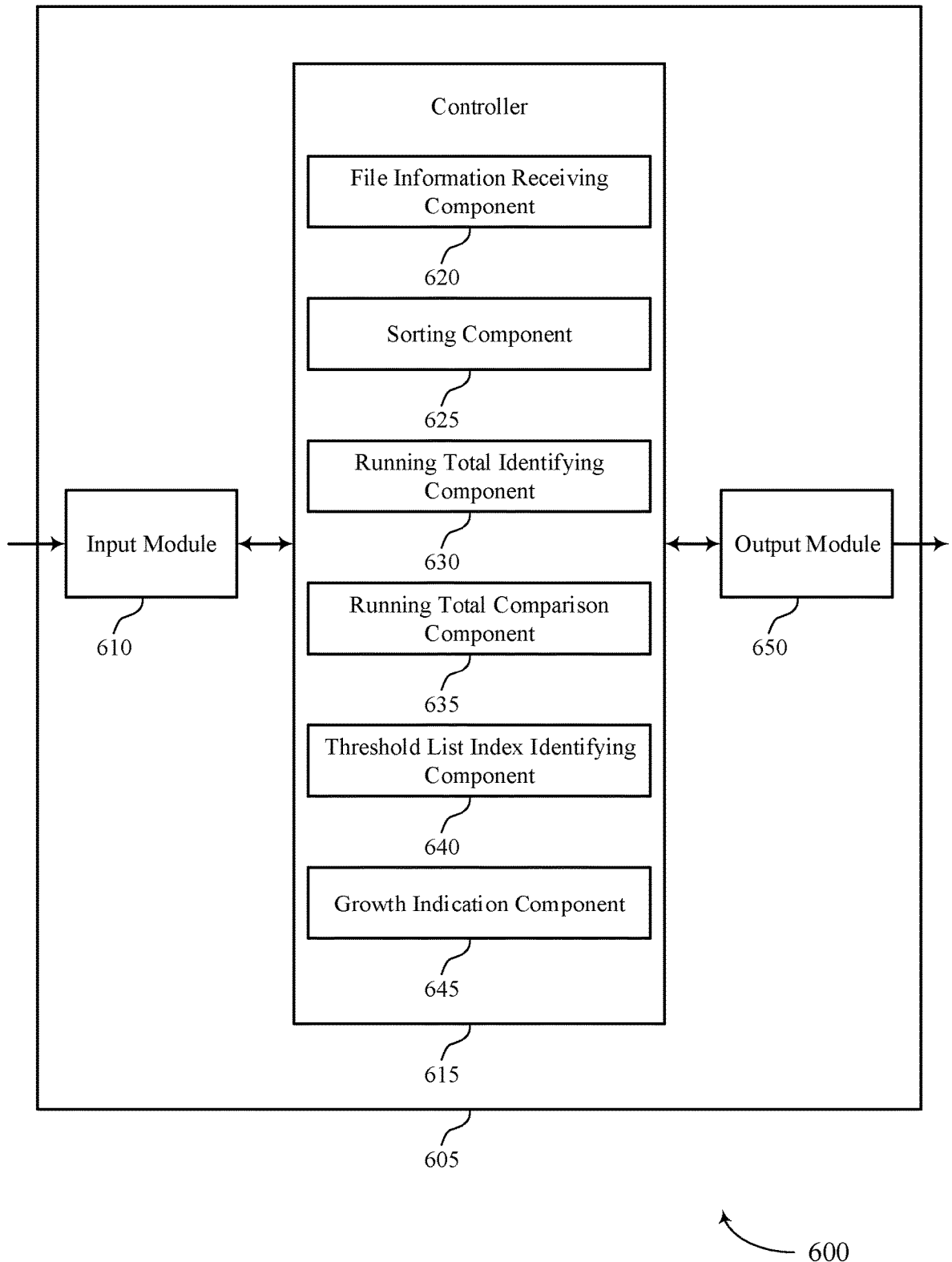
FIG. 6 shows a block diagram of an apparatus that supports uniform growth for differently sized files in accordance with aspects of the present disclosure.

FIG. 6 shows a block diagram 600 of an apparatus 605 that supports uniform growth for differently sized files in accordance with aspects of the present disclosure. The apparatus 605 may include an input module 610, a controller 615, and an output module 650. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the controller 615 to support uniform growth for differently sized files. In some cases, the input module 610 may be a component of an I/O controller 815 as described with reference to FIG. 8.

The controller 615 may include a file information receiving component 620, a sorting component 625, a running total identifying component 630, a running total comparison component 635, a threshold list index identifying component 640, and a growth indication component 645. The controller 615 may be an example of aspects of the controller 705 or 810 described with reference to FIGS. 7 and 8.

The controller 615 and/or at least some of its various sub-components may be implemented in hardware, software executed by a processor, firmware, or any combination thereof. If implemented in software executed by a processor, the functions of the controller 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 615 and/or at least some of its various sub-components may be physically located at various positions, including being distributed such that portions of functions are implemented at different physical locations by one or more physical devices. In some examples, the controller 615 and/or at least some of its various sub-components may be a separate and distinct component in accordance with various aspects of the present disclosure. In other examples, the controller 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The file information receiving component 620 may receive, from a server, a file group growth indicator and a set of file sizes corresponding to a set of files of a file group.

The sorting component 625 may sort the set of file sizes into a list of file sizes including a set of list indexes such that a smallest file size corresponds to a least list index and a largest file size corresponds to a greatest list index.

The running total identifying component 630 may identify a set of uniform growth running totals for the list of file sizes, where each uniform growth running total for a respective list index of the set of list indexes indicates a total growth amount to grow each file size with a list index less than the respective list index to a file size of the respective list index.

The running total comparison component 635 may compare the file group growth indicator to each uniform growth running total of the set of uniform growth running totals.

The threshold list index identifying component 640 may determine a threshold list index of the set of list indexes based on the comparing.

The growth indication component 645 may transmit, to the server, an indication to grow a subset of files of the set of files corresponding to each list index of the set of list indexes less than or equal to the threshold list index.

The output module 650 may manage output signals for the apparatus 605. For example, the output module 650 may receive signals from other components of the apparatus 605, such as the controller 615, and may transmit these signals to other components or devices. In some specific examples, the output module 650 may transmit output signals for display in a user interface, for storage in a database or data store, for further processing at a server or server cluster, or for any other processes at any number of devices or systems. In some cases, the output module 650 may be a component of an I/O controller 815 as described with reference to FIG. 8.

Figure 7:
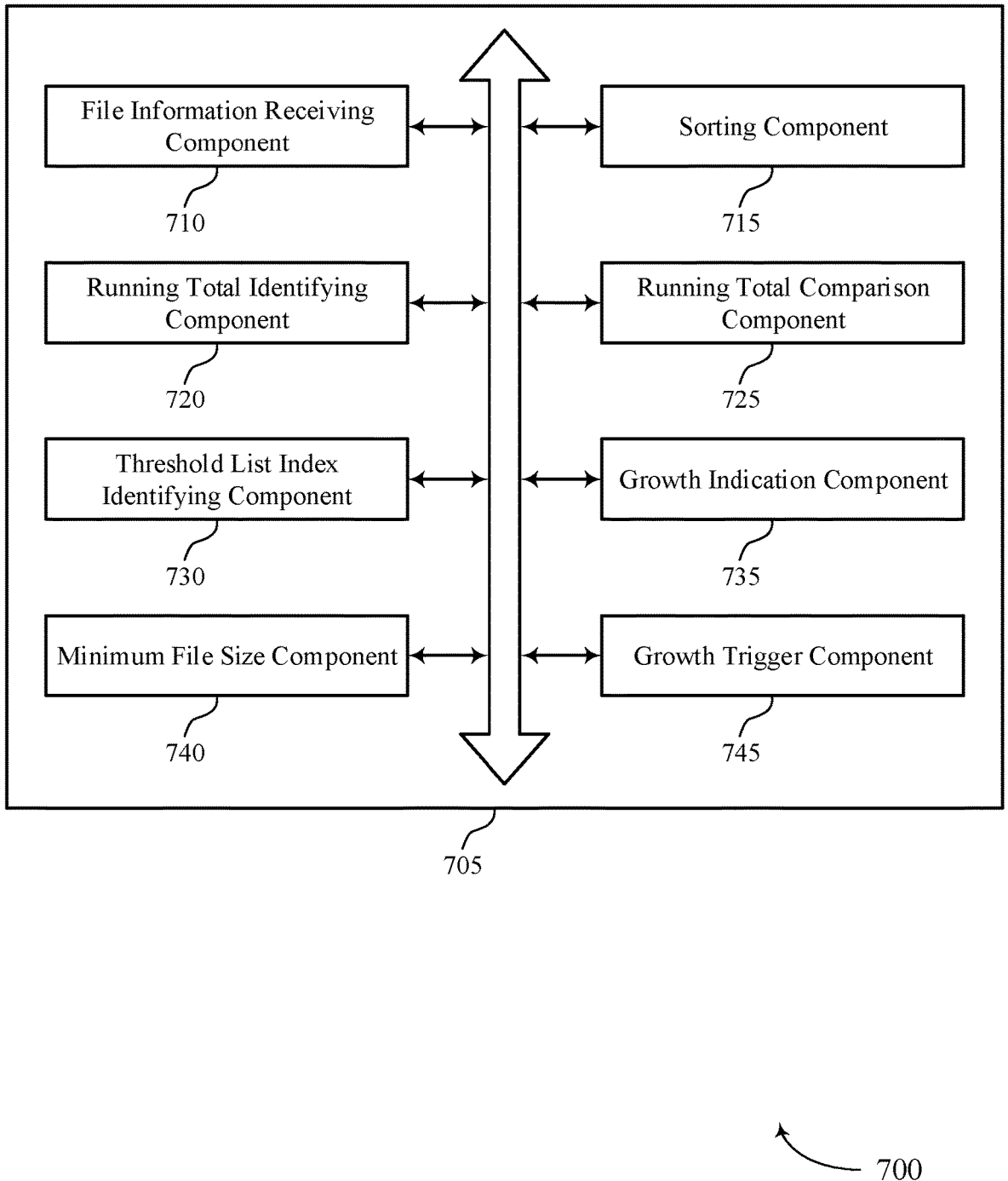
FIG. 7 shows a block diagram of a controller that supports uniform growth for differently sized files in accordance with aspects of the present disclosure.

FIG. 7 shows a block diagram 700 of a controller 705 that supports uniform growth for differently sized files in accordance with aspects of the present disclosure. The controller 705 may be an example of aspects of a controller 615 or a controller 810 described herein. The controller 705 may include a file information receiving component 710, a sorting component 715, a running total identifying component 720, a running total comparison component 725, a threshold list index identifying component 730, a growth indication component 735, a minimum file size component 740, and a growth trigger component 745. Each of these modules may communicate, directly or indirectly, with one another (e.g., via one or more buses).

The file information receiving component 710 may receive, from a server, a file group growth indicator and a set of file sizes corresponding to a set of files of a file group. In some cases, the server is a SQL server.

The sorting component 715 may sort the set of file sizes into a list of file sizes including a set of list indexes such that a smallest file size corresponds to a least list index and a largest file size corresponds to a greatest list index. The running total identifying component 720 may identify a set of uniform growth running totals for the list of file sizes, where each uniform growth running total for a respective list index of the set of list indexes indicates a total growth amount to grow each file size with a list index less than the respective list index to a file size of the respective list index.

The running total comparison component 725 may compare the file group growth indicator to each uniform growth running total of the set of uniform growth running totals. In some examples, the running total comparison component 725 may determine whether the file group growth indicator is greater than a respective uniform growth running total of the set of uniform growth running totals.

The threshold list index identifying component 730 may determine a threshold list index of the set of list indexes based on the comparing. In some examples, determining the threshold list index may involve the running total comparison component 725 identifying a largest uniform growth running total which is smaller than the file group growth indicator, where the threshold list index corresponds to the identified largest uniform growth running total.

The growth indication component 735 may transmit, to the server, an indication to grow a subset of files of the set of files corresponding to each list index of the set of list indexes less than or equal to the threshold list index. In some cases, the indication to grow the subset of files indicates to grow each file of the subset of files to a same file size based on an even distribution of the file group growth indicator among the subset of files. In some other cases, the indication to grow the subset of files indicates to grow one or more first files to a first file size and one or more second files to a second file size different from the first file size based on an uneven distribution of the file group growth indicator among the subset of files. In some examples, the indication includes instructions to alter file sizes for the subset of files. In some cases, the instructions are SQL statements.

The minimum file size component 740 may determine a minimum file size based on the set of uniform growth running totals and the threshold list index, where the indication to grow the subset of files further indicates to uniformly grow the subset of files based on the minimum file size.

The growth trigger component 745 may detect a growth trigger for a file of the set of files of the file group, where the file group growth indicator and the set of file sizes are received based on detecting the growth trigger. In some examples, the growth trigger component 745 may monitor growth rates for each of the set of files of the file group.

In some examples, the growth trigger component 745 may determine that a file of the set of files is to trigger an automatic growth procedure according to the monitoring, where the growth trigger is detected based on the automatic growth procedure. In some examples, the growth trigger component 745 may transmit a request for the file group growth indicator and the set of file sizes based on the automatic growth procedure, where the receiving is based on the request.

Figure 8:
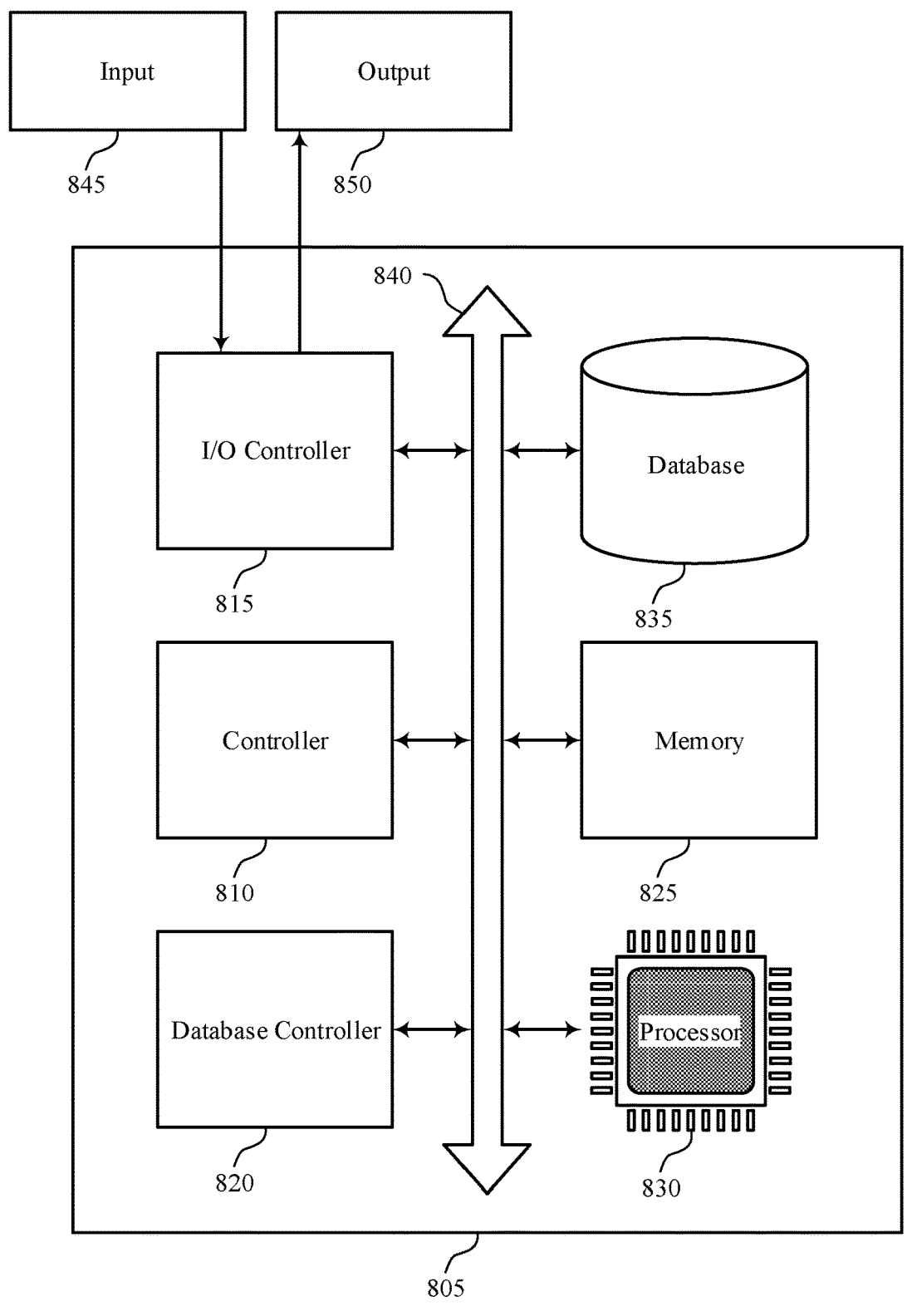
FIG. 8 shows a diagram of a system including a device that supports uniform growth for differently sized files in accordance with aspects of the present disclosure.

FIG. 8 shows a diagram of a system 800 including a device 805 that supports uniform growth for differently sized files in accordance with aspects of the present disclosure. The device 805 may be an example of or include the components of an application server or an apparatus 605 as described herein. The device 805 may include components for bi-directional data communications including components for transmitting and receiving communications, including a controller 810, an I/O controller 815, a database controller 820, memory 825, a processor 830, and a database 835. These components may be in electronic communication via one or more buses (e.g., bus 840).

The controller 810 may be an example of a controller 615 or 705 as described herein. For example, the controller 810 may perform any of the methods or processes described above with reference to FIGS. 6 and 7. In some cases, the controller 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic I/O system (BIOS) which may control basic hardware or software operation such as the interaction with peripheral components or devices.

The processor 830 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting uniform growth for differently sized files).

Figure 9:
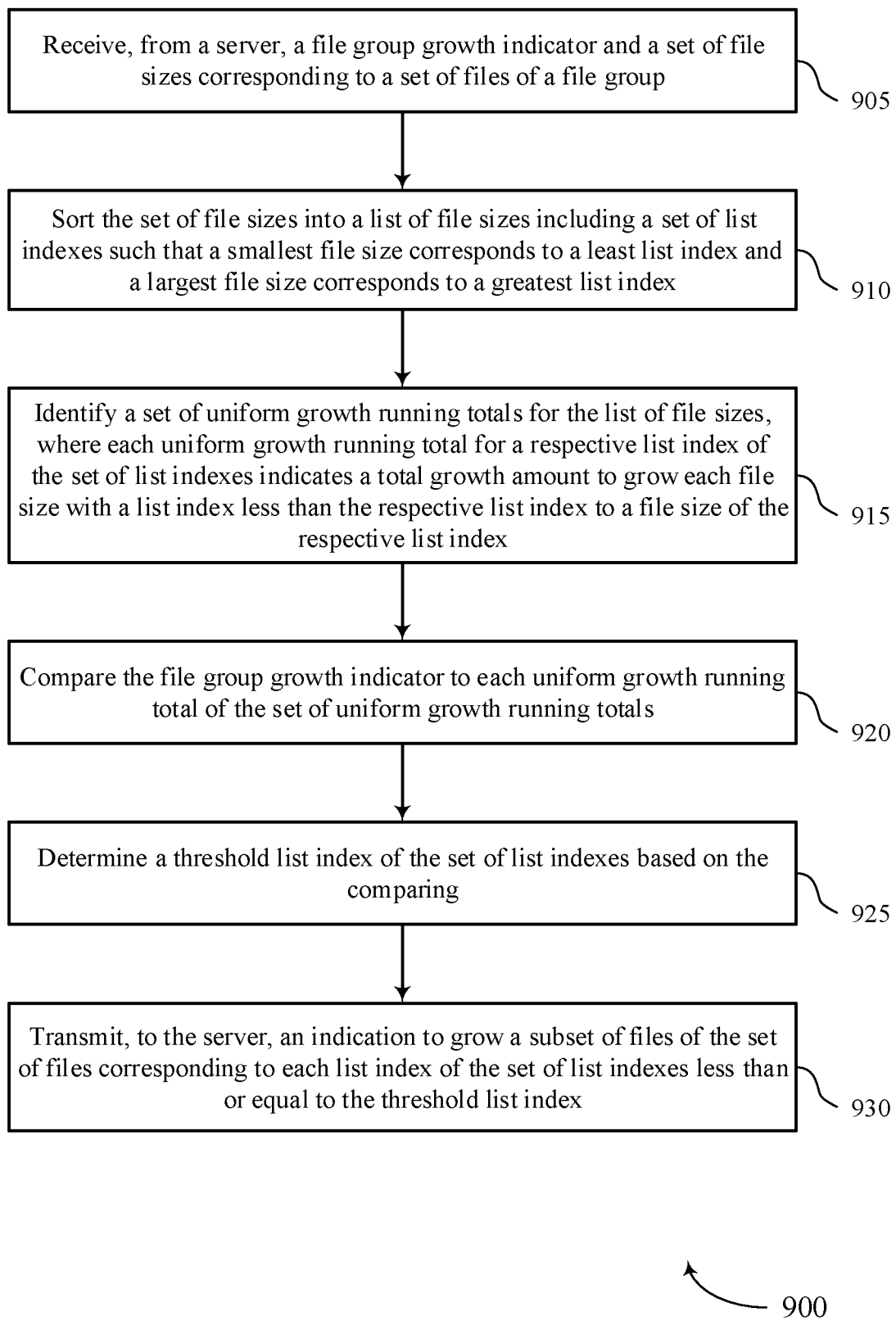
FIGS. 9 through 12 show flowcharts illustrating methods that support uniform growth for differently sized files in accordance with aspects of the present disclosure.

FIG. 9 shows a flowchart illustrating a method 900 that supports uniform growth for differently sized files in accordance with aspects of the present disclosure. The operations of method 900 may be implemented by an application server or its components as described herein. For example, the operations of method 900 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive, from a server, a file group growth indicator and a set of file sizes corresponding to a set of files of a file group. The operations of 905 may be performed according to the methods described herein. In some examples, aspects of the operations of 905 may be performed by a file information receiving component as described with reference to FIGS. 6 through 8.

At 910, the application server may sort the set of file sizes into a list of file sizes including a set of list indexes such that a smallest file size corresponds to a least list index and a largest file size corresponds to a greatest list index. The operations of 910 may be performed according to the methods described herein. In some examples, aspects of the operations of 910 may be performed by a sorting component as described with reference to FIGS. 6 through 8.

At 915, the application server may identify a set of uniform growth running totals for the list of file sizes, where each uniform growth running total for a respective list index of the set of list indexes indicates a total growth amount to grow each file size with a list index less than the respective list index to a file size of the respective list index. The operations of 915 may be performed according to the methods described herein. In some examples, aspects of the operations of 915 may be performed by a running total identifying component as described with reference to FIGS. 6 through 8.

At 920, the application server may compare the file group growth indicator to each uniform growth running total of the set of uniform growth running totals. The operations of 920 may be performed according to the methods described herein. In some examples, aspects of the operations of 920 may be performed by a running total comparison component as described with reference to FIGS. 6 through 8.

At 925, the application server may determine a threshold list index of the set of list indexes based on the comparing. The operations of 925 may be performed according to the methods described herein. In some examples, aspects of the operations of 925 may be performed by a threshold list index identifying component as described with reference to FIGS. 6 through 8.

At 930, the application server may transmit, to the server, an indication to grow a subset of files of the set of files corresponding to each list index of the set of list indexes less than or equal to the threshold list index. The operations of 930 may be performed according to the methods described herein. In some examples, aspects of the operations of 930 may be performed by a growth indication component as described with reference to FIGS. 6 through 8.

Figure 10:
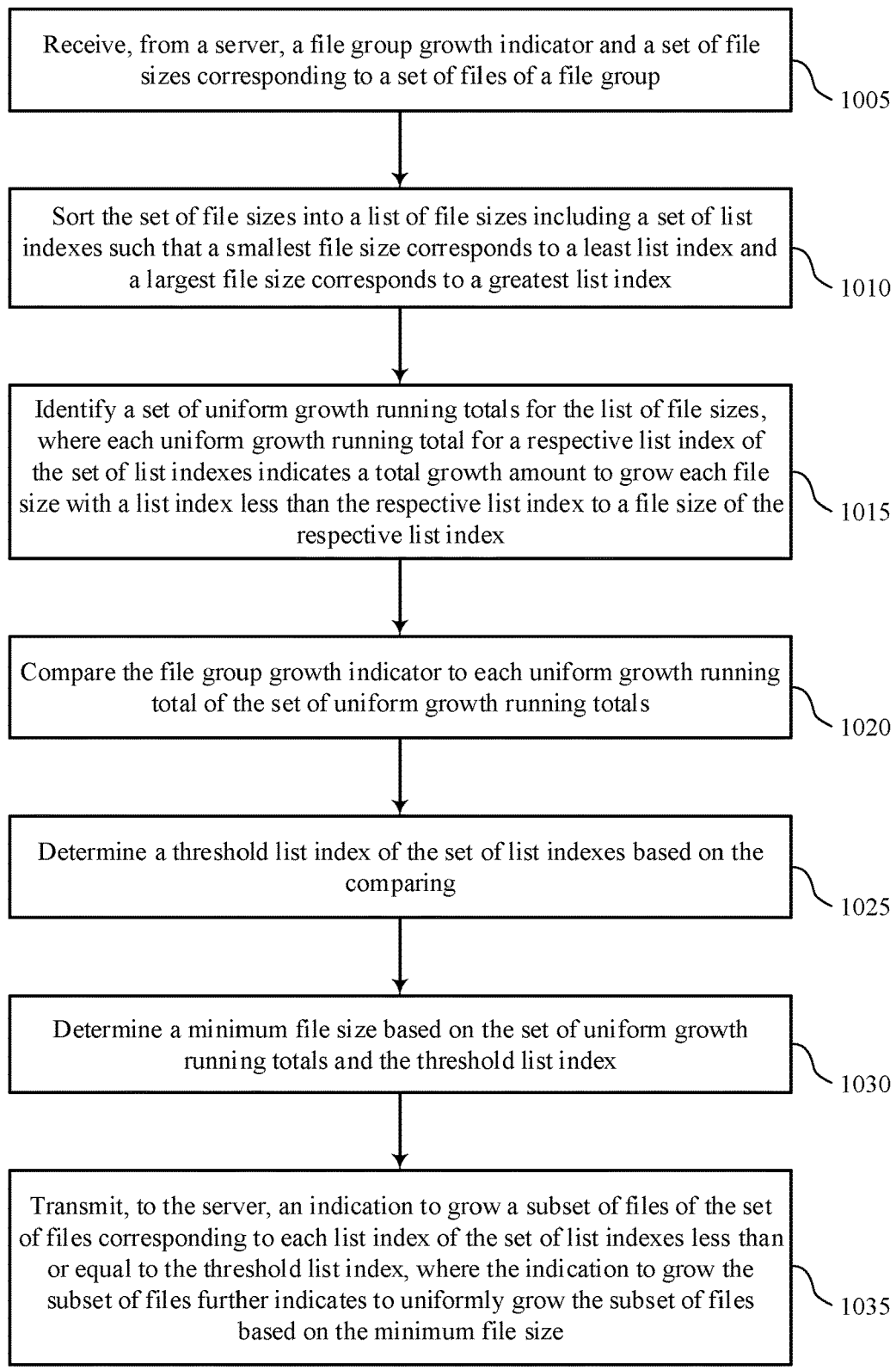

FIG. 10 shows a flowchart illustrating a method 1000 that supports uniform growth for differently sized files in accordance with aspects of the present disclosure. The operations of method 1000 may be implemented by an application server or its components as described herein. For example, the operations of method 1000 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may receive, from a server, a file group growth indicator and a set of file sizes corresponding to a set of files of a file group. The operations of 1005 may be performed according to the methods described herein. In some examples, aspects of the operations of 1005 may be performed by a file information receiving component as described with reference to FIGS. 6 through 8.

At 1010, the application server may sort the set of file sizes into a list of file sizes including a set of list indexes such that a smallest file size corresponds to a least list index and a largest file size corresponds to a greatest list index. The operations of 1010 may be performed according to the methods described herein. In some examples, aspects of the operations of 1010 may be performed by a sorting component as described with reference to FIGS. 6 through 8.

At 1015, the application server may identify a set of uniform growth running totals for the list of file sizes, where each uniform growth running total for a respective list index of the set of list indexes indicates a total growth amount to grow each file size with a list index less than the respective list index to a file size of the respective list index. The operations of 1015 may be performed according to the methods described herein. In some examples, aspects of the operations of 1015 may be performed by a running total identifying component as described with reference to FIGS. 6 through 8.

At 1020, the application server may compare the file group growth indicator to each uniform growth running total of the set of uniform growth running totals. The operations of 1020 may be performed according to the methods described herein. In some examples, aspects of the operations of 1020 may be performed by a running total comparison component as described with reference to FIGS. 6 through 8.

At 1025, the application server may determine a threshold list index of the set of list indexes based on the comparing. The operations of 1025 may be performed according to the methods described herein. In some examples, aspects of the operations of 1025 may be performed by a threshold list index identifying component as described with reference to FIGS. 6 through 8.

At 1030, the application server may determine a minimum file size based on the set of uniform growth running totals and the threshold list index. The operations of 1030 may be performed according to the methods described herein. In some examples, aspects of the operations of 1030 may be performed by a minimum file size component as described with reference to FIGS. 6 through 8.

At 1035, the application server may transmit, to the server, an indication to grow a subset of files of the set of files corresponding to each list index of the set of list indexes less than or equal to the threshold list index, where the indication to grow the subset of files further indicates to uniformly grow the subset of files based on the minimum file size. The operations of 1035 may be performed according to the methods described herein. In some examples, aspects of the operations of 1035 may be performed by a growth indication component as described with reference to FIGS. 6 through 8.

Figure 11:
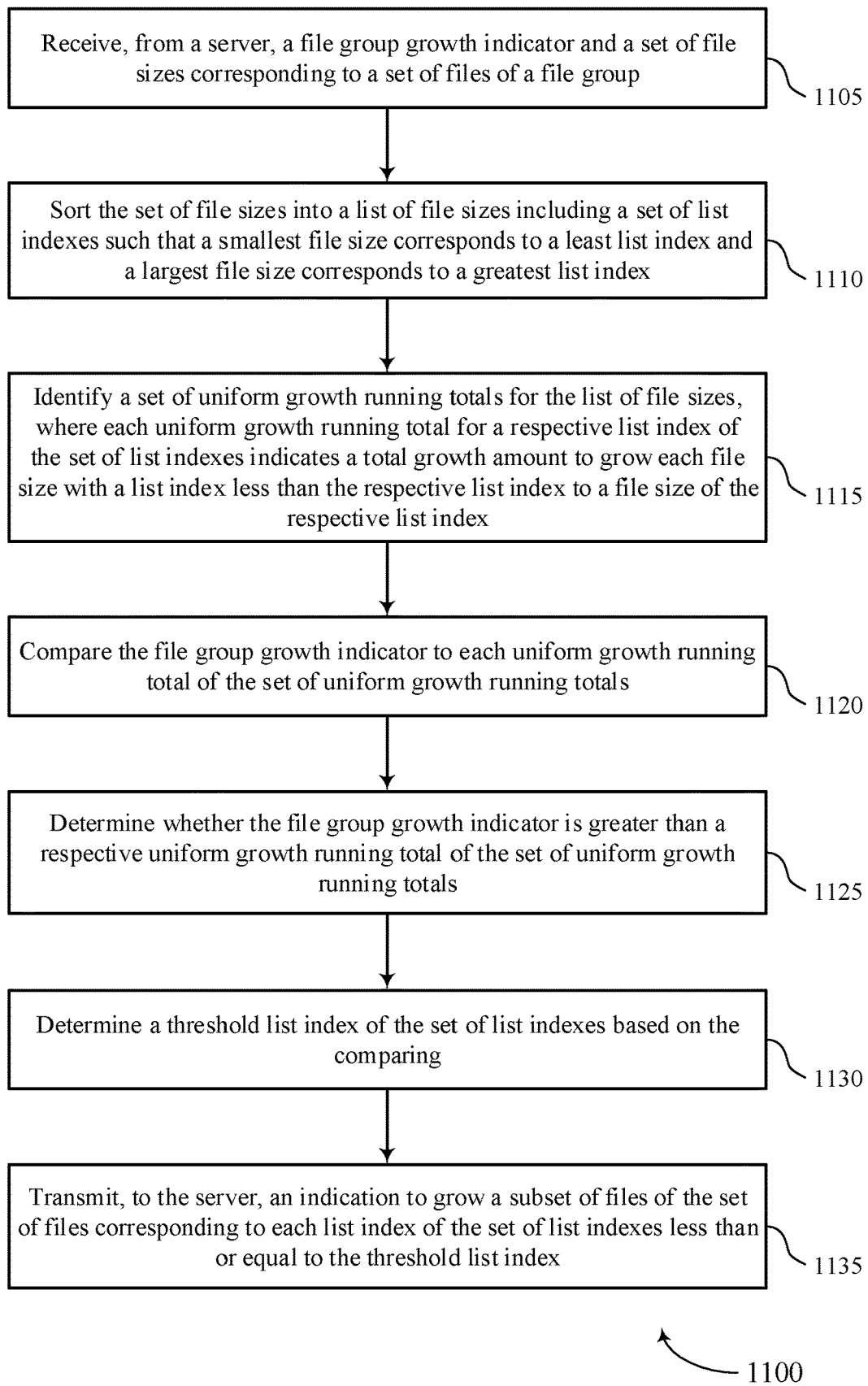

FIG. 11 shows a flowchart illustrating a method 1100 that supports uniform growth for differently sized files in accordance with aspects of the present disclosure. The operations of method 1100 may be implemented by an application server or its components as described herein. For example, the operations of method 1100 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may receive, from a server, a file group growth indicator and a set of file sizes corresponding to a set of files of a file group. The operations of 1105 may be performed according to the methods described herein. In some examples, aspects of the operations of 1105 may be performed by a file information receiving component as described with reference to FIGS. 6 through 8.

At 1110, the application server may sort the set of file sizes into a list of file sizes including a set of list indexes such that a smallest file size corresponds to a least list index and a largest file size corresponds to a greatest list index. The operations of 1110 may be performed according to the methods described herein. In some examples, aspects of the operations of 1110 may be performed by a sorting component as described with reference to FIGS. 6 through 8.

At 1115, the application server may identify a set of uniform growth running totals for the list of file sizes, where each uniform growth running total for a respective list index of the set of list indexes indicates a total growth amount to grow each file size with a list index less than the respective list index to a file size of the respective list index. The operations of 1115 may be performed according to the methods described herein. In some examples, aspects of the operations of 1115 may be performed by a running total identifying component as described with reference to FIGS. 6 through 8.

At 1120, the application server may compare the file group growth indicator to each uniform growth running total of the set of uniform growth running totals. The operations of 1120 may be performed according to the methods described herein. In some examples, aspects of the operations of 1120 may be performed by a running total comparison component as described with reference to FIGS. 6 through 8.

At 1125, the application server may determine whether the file group growth indicator is greater than a respective uniform growth running total of the set of uniform growth running totals. The operations of 1125 may be performed according to the methods described herein. In some examples, aspects of the operations of 1125 may be performed by a running total comparison component as described with reference to FIGS. 6 through 8.

At 1130, the application server may determine a threshold list index of the set of list indexes based on the comparing. The operations of 1130 may be performed according to the methods described herein. In some examples, aspects of the operations of 1130 may be performed by a threshold list index identifying component as described with reference to FIGS. 6 through 8.

At 1135, the application server may transmit, to the server, an indication to grow a subset of files of the set of files corresponding to each list index of the set of list indexes less than or equal to the threshold list index. The operations of 1135 may be performed according to the methods described herein. In some examples, aspects of the operations of 1135 may be performed by a growth indication component as described with reference to FIGS. 6 through 8.

Figure 12:
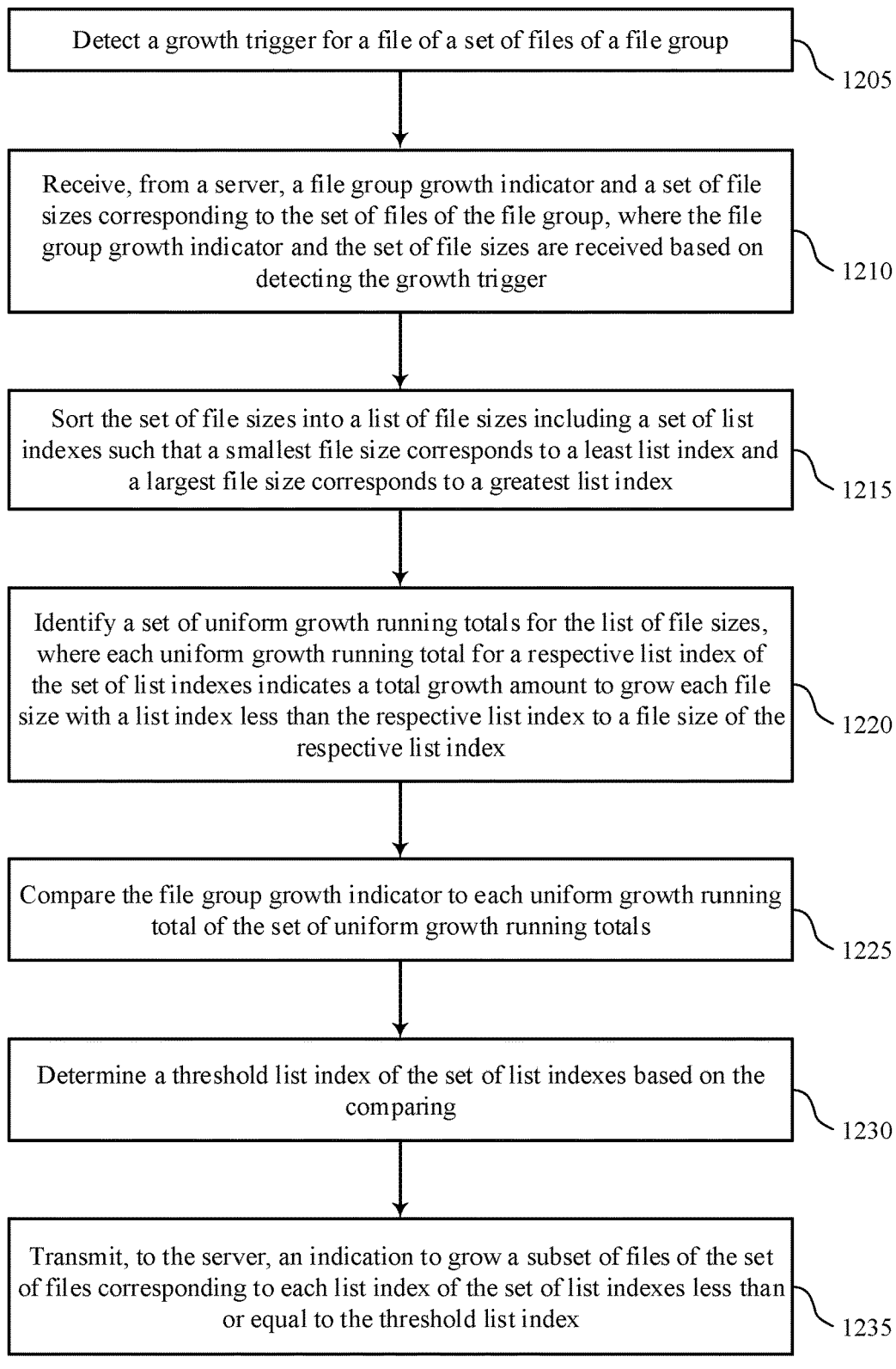

FIG. 12 shows a flowchart illustrating a method 1200 that supports uniform growth for differently sized files in accordance with aspects of the present disclosure. The operations of method 1200 may be implemented by an application server or its components as described herein. For example, the operations of method 1200 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1205, the application server may detect a growth trigger for a file of a set of files of a file group. The operations of 1205 may be performed according to the methods described herein. In some examples, aspects of the operations of 1205 may be performed by a growth trigger component as described with reference to FIGS. 6 through 8.

At 1210, the application server may receive, from a server, a file group growth indicator and a set of file sizes corresponding to the set of files of the file group, where the file group growth indicator and the set of file sizes are received based on detecting the growth trigger. The operations of 1210 may be performed according to the methods described herein. In some examples, aspects of the operations of 1210 may be performed by a file information receiving component as described with reference to FIGS. 6 through 8.

At 1215, the application server may sort the set of file sizes into a list of file sizes including a set of list indexes such that a smallest file size corresponds to a least list index and a largest file size corresponds to a greatest list index. The operations of 1215 may be performed according to the methods described herein. In some examples, aspects of the operations of 1215 may be performed by a sorting component as described with reference to FIGS. 6 through 8.

At 1220, the application server may identify a set of uniform growth running totals for the list of file sizes, where each uniform growth running total for a respective list index of the set of list indexes indicates a total growth amount to grow each file size with a list index less than the respective list index to a file size of the respective list index. The operations of 1220 may be performed according to the methods described herein. In some examples, aspects of the operations of 1220 may be performed by a running total identifying component as described with reference to FIGS. 6 through 8.

At 1225, the application server may compare the file group growth indicator to each uniform growth running total of the set of uniform growth running totals. The operations of 1225 may be performed according to the methods described herein. In some examples, aspects of the operations of 1225 may be performed by a running total comparison component as described with reference to FIGS. 6 through 8.

At 1230, the application server may determine a threshold list index of the set of list indexes based on the comparing. The operations of 1230 may be performed according to the methods described herein. In some examples, aspects of the operations of 1230 may be performed by a threshold list index identifying component as described with reference to FIGS. 6 through 8.

At 1235, the application server may transmit, to the server, an indication to grow a subset of files of the set of files corresponding to each list index of the set of list indexes less than or equal to the threshold list index. The operations of 1235 may be performed according to the methods described herein. In some examples, aspects of the operations of 1235 may be performed by a growth indication component as described with reference to FIGS. 6 through 8.

A method for file growth handling is described. The method may include receiving, from a server, a file group growth indicator and a set of file sizes corresponding to a set of files of a file group, sorting the set of file sizes into a list of file sizes including a set of list indexes such that a smallest file size corresponds to a least list index and a largest file size corresponds to a greatest list index, identifying a set of uniform growth running totals for the list of file sizes, where each uniform growth running total for a respective list index of the set of list indexes indicates a total growth amount to grow each file size with a list index less than the respective list index to a file size of the respective list index, comparing the file group growth indicator to each uniform growth running total of the set of uniform growth running totals, determining a threshold list index of the set of list indexes based on the comparing, and transmitting, to the server, an indication to grow a subset of files of the set of files corresponding to each list index of the set of list indexes less than or equal to the threshold list index.

An apparatus for file growth handling is described. The apparatus may include a processor, memory coupled with the processor, and instructions stored in the memory. The instructions may be executable by the processor to cause the apparatus to receive, from a server, a file group growth indicator and a set of file sizes corresponding to a set of files of a file group, sort the set of file sizes into a list of file sizes including a set of list indexes such that a smallest file size corresponds to a least list index and a largest file size corresponds to a greatest list index, identify a set of uniform growth running totals for the list of file sizes, where each uniform growth running total for a respective list index of the set of list indexes indicates a total growth amount to grow each file size with a list index less than the respective list index to a file size of the respective list index, compare the file group growth indicator to each uniform growth running total of the set of uniform growth running totals, determine a threshold list index of the set of list indexes based on the comparing, and transmit, to the server, an indication to grow a subset of files of the set of files corresponding to each list index of the set of list indexes less than or equal to the threshold list index.

Another apparatus for file growth handling is described. The apparatus may include means for receiving, from a server, a file group growth indicator and a set of file sizes corresponding to a set of files of a file group, sorting the set of file sizes into a list of file sizes including a set of list indexes such that a smallest file size corresponds to a least list index and a largest file size corresponds to a greatest list index, identifying a set of uniform growth running totals for the list of file sizes, where each uniform growth running total for a respective list index of the set of list indexes indicates a total growth amount to grow each file size with a list index less than the respective list index to a file size of the respective list index, comparing the file group growth indicator to each uniform growth running total of the set of uniform growth running totals, determining a threshold list index of the set of list indexes based on the comparing, and transmitting, to the server, an indication to grow a subset of files of the set of files corresponding to each list index of the set of list indexes less than or equal to the threshold list index.

A non-transitory computer-readable medium storing code for file growth handling is described. The code may include instructions executable by a processor to receive, from a server, a file group growth indicator and a set of file sizes corresponding to a set of files of a file group, sort the set of file sizes into a list of file sizes including a set of list indexes such that a smallest file size corresponds to a least list index and a largest file size corresponds to a greatest list index, identify a set of uniform growth running totals for the list of file sizes, where each uniform growth running total for a respective list index of the set of list indexes indicates a total growth amount to grow each file size with a list index less than the respective list index to a file size of the respective list index, compare the file group growth indicator to each uniform growth running total of the set of uniform growth running totals, determine a threshold list index of the set of list indexes based on the comparing, and transmit, to the server, an indication to grow a subset of files of the set of files corresponding to each list index of the set of list indexes less than or equal to the threshold list index.

Some examples of the method, apparatuses, and non-transitory computer-readable medium described herein may further include operations, features, means, or instructions for determining a minimum file size based on the set of uniform growth running totals and the threshold list index, where the indication to grow the subset of files further indicates to uniformly grow the subset of files based on the minimum file size.

In some examples of the method, apparatuses, and non-transitory computer-readable medium described herein, the comparing may include operations, features, means, or instructions for determining whether the file group growth indicator may be greater than a respective uniform growth running total of the set of uniform growth running totals.

In some examples of the method, apparatuses, and non-transitory computer-readable medium described herein, determining the threshold list index may include operations, features, means, or instructions for identifying a largest uniform growth running total which may be smaller than the file group growth indicator, where the threshold list index corresponds to the identified largest uniform growth running total.

Some examples of the method, apparatuses, and non-transitory computer-readable medium described herein may further include operations, features, means, or instructions for detecting a growth trigger for a file of the set of files of the file group, where the file group growth indicator and the set of file sizes may be received based on detecting the growth trigger.

Some examples of the method, apparatuses, and non-transitory computer-readable medium described herein may further include operations, features, means, or instructions for monitoring growth rates for each of the set of files of the file group and determining that a file of the set of files may be to trigger an automatic growth procedure according to the monitoring, where the growth trigger may be detected based on the automatic growth procedure.

Some examples of the method, apparatuses, and non-transitory computer-readable medium described herein may further include operations, features, means, or instructions for transmitting a request for the file group growth indicator and the set of file sizes based on the automatic growth procedure, where the receiving may be based on the request.

In some examples of the method, apparatuses, and non-transitory computer-readable medium described herein, the indication to grow the subset of files indicates to grow each file of the subset of files to a same file size based on an even distribution of the file group growth indicator among the subset of files.

In some examples of the method, apparatuses, and non-transitory computer-readable medium described herein, the indication to grow the subset of files indicates to grow one or more first files to a first file size and one or more second files to a second file size different from the first file size based on an uneven distribution of the file group growth indicator among the subset of files.

In some examples of the method, apparatuses, and non-transitory computer-readable medium described herein, the indication includes instructions to alter file sizes for the subset of files.

In some examples of the method, apparatuses, and non-transitory computer-readable medium described herein, the instructions may be SQL statements.

In some examples of the method, apparatuses, and non-transitory computer-readable medium described herein, the server may be a SQL server.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for file growth handling, comprising:
   receiving, from a server, a file group growth indicator and a plurality of file sizes corresponding to a plurality of files of a file group;
   sorting the plurality of file sizes into a list of file sizes comprising a plurality of list indexes such that a smallest file size corresponds to a least list index and a largest file size corresponds to a greatest list index;
   identifying a plurality of uniform growth running totals for the list of file sizes, wherein a uniform growth running total for a respective list index of the plurality of list indexes indicates a total growth amount to grow each file size with a list index less than the respective list index to a file size of the respective list index;
   comparing the file group growth indicator to one or more uniform growth running totals of the plurality of uniform growth running totals, wherein the comparing comprises determining whether the file group growth indicator is greater than a respective uniform growth running total of the plurality of uniform growth running totals;
   determining a threshold list index of the plurality of list indexes based at least in part on the comparing; and
   transmitting, to the server, an indication to grow a subset of files of the plurality of files corresponding to each list index of the plurality of list indexes less than or equal to the threshold list index.

2. The method of claim 1, further comprising:
   determining a minimum file size based at least in part on the plurality of uniform growth running totals and the threshold list index, wherein the indication to grow the subset of files further indicates to uniformly grow the subset of files based at least in part on the minimum file size.

3. The method of claim 1, wherein determining the threshold list index comprises:
   identifying a largest uniform growth running total which is smaller than the file group growth indicator, wherein the threshold list index corresponds to the identified largest uniform growth running total.

4. The method of claim 1, further comprising:
   detecting a growth trigger for a file of the plurality of files of the file group, wherein the file group growth indicator and the plurality of file sizes are received based at least in part on detecting the growth trigger.

5. The method of claim 3, further comprising:
   monitoring growth rates for each of the plurality of files of the file group; and
   determining that a file of the plurality of files is to trigger an automatic growth procedure according to the monitoring, wherein the growth trigger is detected based at least in part on the automatic growth procedure.

6. The method of claim 5, further comprising:
   transmitting a request for the file group growth indicator and the plurality of file sizes based at least in part on the automatic growth procedure, wherein the receiving is based at least in part on the request.

7. The method of claim 1, wherein the indication to grow the subset of files indicates to grow each file of the subset of files to a same file size based at least in part on an even distribution of the file group growth indicator among the subset of files.

8. The method of claim 1, wherein the indication to grow the subset of files indicates to grow one or more first files to a first file size and one or more second files to a second file size different from the first file size based at least in part on an uneven distribution of the file group growth indicator among the subset of files.

9. The method of claim 1, wherein the indication comprises instructions to alter file sizes for the subset of files.

10. The method of claim 9, wherein the instructions are structured query language (SQL) statements.

11. The method of claim 1, wherein the server is a structured query language (SQL) server.

12. An apparatus for file growth handling, comprising:
    a processor;
    memory coupled with the processor; and
    instructions stored in the memory and executable by the processor to cause the apparatus to:
    receive, from a server, a file group growth indicator and a plurality of file sizes corresponding to a plurality of files of a file group;
    sort the plurality of file sizes into a list of file sizes comprising a plurality of list indexes such that a smallest file size corresponds to a least list index and a largest file size corresponds to a greatest list index;
    identify a plurality of uniform growth running totals for the list of file sizes, wherein a uniform growth running total for a respective list index of the plurality of list indexes indicates a total growth amount to grow each file size with a list index less than the respective list index to a file size of the respective list index;
    compare the file group growth indicator to one or more uniform growth running totals of the plurality of uniform growth running totals, wherein the comparing comprises determining whether the file group growth indicator is greater than a respective uniform growth running total of the plurality of uniform growth running totals;
    determine a threshold list index of the plurality of list indexes based at least in part on the comparing; and
    transmit, to the server, an indication to grow a subset of files of the plurality of files corresponding to each list index of the plurality of list indexes less than or equal to the threshold list index.

13. The apparatus of claim 12, wherein the instructions are further executable by the processor to cause the apparatus to:
   determine a minimum file size based at least in part on the plurality of uniform growth running totals and the threshold list index, wherein the indication to grow the subset of files further indicates to uniformly grow the subset of files based at least in part on the minimum file size.

14. The apparatus of claim 12, wherein the instructions to determine the threshold list index are further executable by the processor to cause the apparatus to:
   identify a largest uniform growth running total which is smaller than the file group growth indicator, wherein the threshold list index corresponds to the identified largest uniform growth running total.

15. The apparatus of claim 12, wherein the instructions are further executable by the processor to cause the apparatus to:
   detect a growth trigger for a file of the plurality of files of the file group, wherein the file group growth indicator and the plurality of file sizes are received based at least in part on detecting the growth trigger.

16. The apparatus of claim 15, wherein the instructions are further executable by the processor to cause the apparatus to:
   monitor growth rates for each of the plurality of files of the file group; and
   determine that a file of the plurality of files is to trigger an automatic growth procedure according to the monitoring, wherein the growth trigger is detected based at least in part on the automatic growth procedure.

17. A non-transitory computer-readable medium storing code for file growth handling, the code comprising instructions executable by a processor to:
   receive, from a server, a file group growth indicator and a plurality of file sizes corresponding to a plurality of files of a file group;
   sort the plurality of file sizes into a list of file sizes comprising a plurality of list indexes such that a smallest file size corresponds to a least list index and a largest file size corresponds to a greatest list index;
   identify a plurality of uniform growth running totals for the list of file sizes, wherein a uniform growth running total for a respective list index of the plurality of list indexes indicates a total growth amount to grow each file size with a list index less than the respective list index to a file size of the respective list index;
   compare the file group growth indicator to one or more uniform growth running totals of the plurality of uniform growth running totals, wherein the comparing comprises determining whether the file group growth indicator is greater than a respective uniform growth running total of the plurality of uniform growth running totals;
   determine a threshold list index of the plurality of list indexes based at least in part on the comparing; and
   transmit, to the server, an indication to grow a subset of files of the plurality of files corresponding to each list index of the plurality of list indexes less than or equal to the threshold list index.

18. The non-transitory computer-readable medium of claim 17, wherein the instructions are further executable to:
   determine a minimum file size based at least in part on the plurality of uniform growth running totals and the threshold list index, wherein the indication to grow the subset of files further indicates to uniformly grow the subset of files based at least in part on the minimum file size.

* * * * *